Dec. 31, 1957   F. F. EHRENHAFT ET AL   2,817,994
AERIAL VIEWING APPARATUS
Filed Oct. 18, 1954   6 Sheets-Sheet 3

INVENTORS:
Franz F. Ehrenhaft and Seymour Rosin
BY
Michael S. Striker
agt.

INVENTORS:
Franz F. Ehrenhaft and Seymour Rosin

United States Patent Office 2,817,994
Patented Dec. 31, 1957

2,817,994
AERIAL VIEWING APPARATUS

Franz F. Ehrenhaft, Forest Hills, and Seymour Rosin, Massepequa Park, N. Y., assignors to Scanoptic Inc., New York, N. Y.

Application October 18, 1954, Serial No. 462,786

8 Claims. (Cl. 88—1)

The present invention relates to optical devices for viewing objects at a distance.

For example, it is often desirable to view objects at a distance from a moving aircraft, and an observer in the nose of such an aircraft requires some type of periscope or the like in order to be able to look forwardly up to the horizon as well as downwardly to the terrain directly beneath the aircraft, because it is impossible to put enough transparent windows in a modern high speed aircraft. Furthermore, the window space which can be provided is necessarily blocked with the many instruments necessary for modern aircraft so that if an observer wishes to obtain information for use in navigation or in aerial photography, for example, it is evident that some sort of optical device is required, and moreover, this optical device must be provided with certain indicia in order to enable the image seen in the optical device to be used intelligently.

In the case of aerial photography, for example, pictures of the terrain over which the aircraft flies are taken in such a way that a certain size area is photographed depending on the type of lens used, and then the next adjoining area in the flight line is photographed, etc. until the mapping of the terrain is photographically completed. It is impossible to take the pictures in such a way that one picture ends exactly where the next successive picture starts, since it is impossible to avoid either overlapping of the pictures or neglecting to photograph areas between two successive pictures. It has, therefore, become standard practice to photograph the terrain beneath an aircraft in such a way that every consecutive picture overlaps 60% of the previous picture, and the establishment of this overlap indication is one of the important duties of the observer who controls the aerial photography. Another duty of this observer is to maintain the pilot on a given flight line even if the aircraft drifts off its course. In order to do this it is essential that a wind drift indication be available to the observer through the image which he sees.

It is customary to incorporate into optical devices of the above type a reticle provided with crosshairs and perhaps other indicia to enable the observer to correlate the movement of the aircraft with the terrain viewed by the observer. For purposes of indicating wind drift such a reticle must be turned about the nadir point. However, the nadir point is in the center of the field of vision only when the line of sight is vertical so that the observer is viewing the terrain directly beneath the aircraft. If other terrain is being observed such as, for example, terrain ahead of the aircraft, it is still necessary for the recticle to turn about the nadir point even though this point happens to be outside of the field of vision. This problem is one of the difficulties involved in observing objects from a distance.

Furthermore, a reticle which is positioned to be correlated with an image of the terrain directly beneath the aircraft is improperly positioned with respect to an image provided by an optical device adjusted to view the terrain at an angle of 45°, for example, with respect to the aircraft. For this reason, it is necessary with known viewing apparatus to provide a plurality of reticles respectively positioned so as to be used with viewing angles of 0°, 45°, and 60°, for example. In fact, it is customary to provide completely independent sets of objectives and reticles for viewing terrain at different angles, respectively.

One of the objects of the present invention is to provide an extremely simple apparatus requiring only one objective and one reticle for viewing the terrain at different angles.

A further object of the present invention is to provide a viewing apparatus with a means for adjusting the same to view the terrain at a desired viewing angle.

Another object of the present invention is to provide such a viewing apparatus with a means for automatically positioning the single reticle of the apparatus properly with respect to the particular viewing angle to which the apparatus is adjusted.

Also, it is an object of the present invention to provide a reticle mounting which guarantees that the reticle turns about the nadir point to indicate wind drift even through this particular point may be out of the field of vision.

An additional object of the present invention is to provide an aircraft of the above type with a means for compensating for pitching movement of the aircraft.

The objects of the present invention also include the provision of an arrangement which will provide a minimum amount of distortion between the image of the terrain and the image of the reticle.

It is furthermore an object of the present invention to provide a viewing apparatus which can be used for many different purposes such as, for example, for aerial photography purposes, for navigation purposes, or simply for observing the terrain in a closed television circuit, for example.

The objects of the present invention also include the provision of a reticle having thereon indicia which will enable an observer to obtain such information as the drift of the aircraft, the ground distance of an observed object from the aircraft, and whether or not an object located at a great distance from the aircraft will be located within a photograph taken shortly after the observation of such an object.

With the above objects in view the present invention mainly consists of an aerial viewing apparatus for viewing the surface of the earth from different angles, this apparatus including a support means and a viewing device mounted on the support means. A first optical means is carried by the support means and has at least part thereof adjustable for creating in the viewing device visible images of parts of the earth's surface as viewed from different angles, respectively. A first adjusting means is operatively connected to the first optical means for moving at least the said part of the first optical means to a position creating in the viewing device an image corresponding to one of the viewing angles. A second optical means is carried by the support means for creating in the viewing device, superimposed on the visible image of a part of the earth's surface, a visible image of a portion of a reticle composed of reticle portions respectively corresponding to different viewing angles of the first optical means. A second adjusting means is interconnected with the first adjusting means to be operated automatically together with the same and is operatively connected to the second optical means for automatically moving into the field of vision of the viewing device an image of that reticle portion which corresponds to the particular viewing angle to which the first optical means is adjusted by the first adjusting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
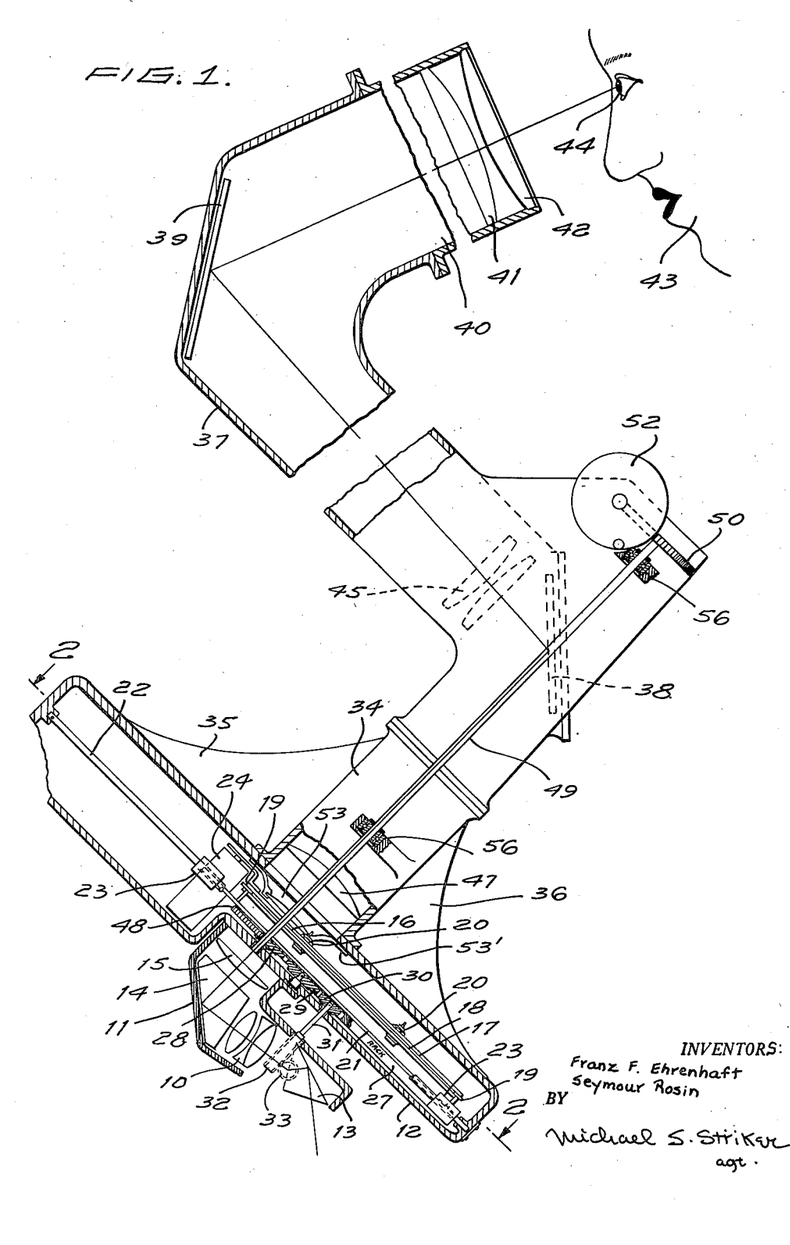
Fig. 1 is a partly sectional side elevation view of a viewing apparatus constructed in accordance with the present invention.
Figure 2:
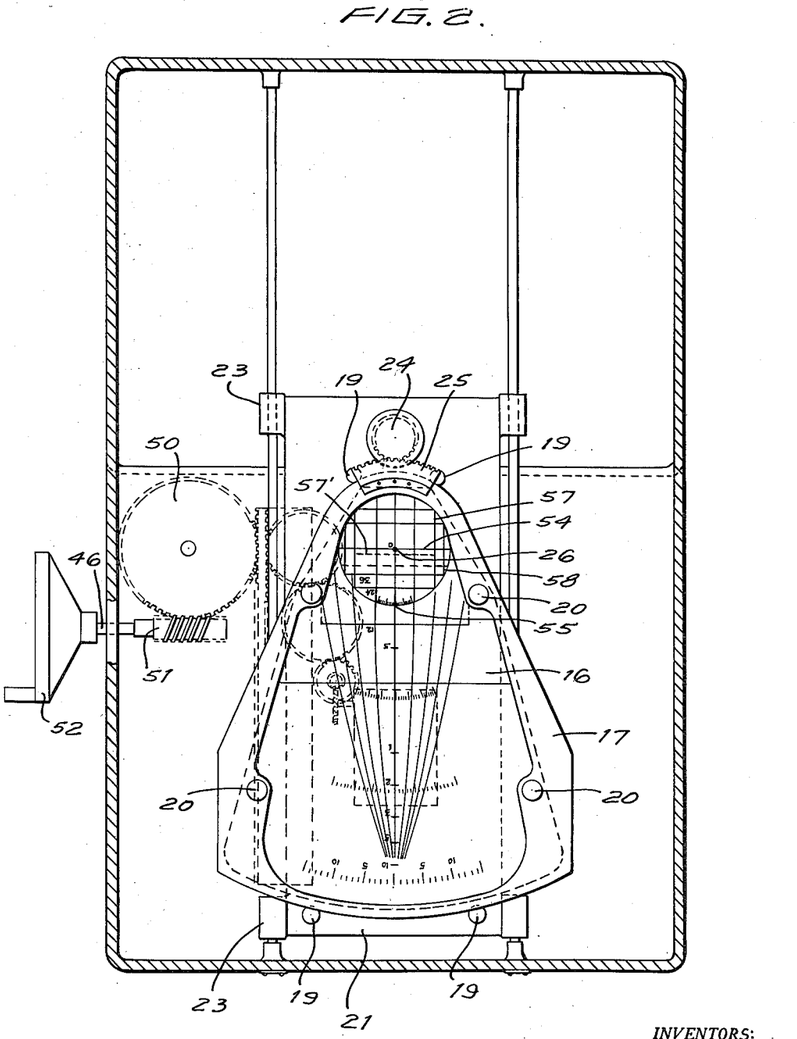
Fig. 2 shows the apparatus of Fig. 1 taken along the line 2—2 of Fig. 1 in the direction of the arrows, Fig. 2 also showing in dot-dash lines the manner in which a transmission is connected to the structure shown in Fig. 2.

Referring now to the drawings and in particular to Figs. 1 and 2, it will be seen that the structure of the invention includes a support means made up in part by the tubular portions 34 and 37 of the viewing apparatus shown in Fig. 1. At the lower left portion of this apparatus, as viewed in Fig. 1, an objective 10 is carried in any suitable way by the frame portion 11 of the support means, this frame portion being fixed to the frame portion 12 of the support means. A prism 13 is tiltably carried by the frame portion 11 and directs to the objective light rays coming from the terrain. A second prism 14 is mounted in the frame portion 11 for directing the light rays, after they pass through the objective 10, through a first field lens 15 carried by frame portion 11, then through a reticle 16, and from the reticle 16 through a second field lens 47 carried by the tubular portion 34 of the support means. The reticle 16 is clearly illustrated in Fig. 2 which shows how the reticle 16 is supported in a frame 17 extending about the periphery of the reticle 16. A fixed reticle 53 is carried by a relatively short tubular member 53' which is fixed to and forms part of the support means, as is evident from Fig. 1.

The frame 17, which carries the reticle 16, is formed along its outer periphery with a groove 18 (Fig. 1). Furthermore, the reticle 16 and frame 17 are provided with aligned openings in which lamps 20 are mounted for illuminating the reticle, the latter being made of Lucite or the like so that the light from the lamps is conducted from the lamps through the material of the reticle to provide edge lighting thereof. As is evident from Figs. 1 and 2, roller bearings 19 or the like are turnably carried by a plurality of studs fixed to the carriage 21, and these roller bearings 19 extend into the groove 18. As is evident from Fig. 2, the opposite ends of the frame 17 are arcuate, and these arcs are respectively located along a pair of circles which are concentric so that the frame 17 and reticle 16 are turnable on the carriage 21 about the center 26 of these circles. The carriage 21 is provided with tubular portions 23 through which a pair of parallel rods 22 slidably extend, these rods being fixed at their ends to the ends of the closed frame portion 12, as shown in Figs. 1 and 2, so that the reticle is shiftable, by movement of carriage 21 on rods 22, in a plane in which the reticle itself is located, this plane being normal to the optical axis of the optical means formed in part by elements 13, 10, 14, 15 and 47. Furthermore, an arcuate gear sector 25 is fixed to the top end of frame 17, as viewed in Fig. 2, and this gear sector 25 meshes with a gear rotated by and coaxial with a motor 24 carried by the carriage 21. Any suitable electrical means extend to the motor 24 for completing a circuit therethrough and this circuit includes a manually operable switch accessible to the observer. The gear sector 25 is located along a curve whose center is at 26, so that when the operator closes the circuit to the motor 24 the latter will turn the reticle about point 26. This point 26 is the nadir point and is in the center of the field of vision only when the prism 13 is directed toward the ground immediately beneath the aircraft. The stationary reticle 53 is provided with crosshairs 54 and 55 which intersect at 26.

In accordance with the present invention a manual drive is provided for changing the viewing angle, by tilting the prism 13, and for simultaneously moving the reticle in its plane normal to the optical axis to a position corresponding to the viewing angle determined by the angular position of prism 13, so that the operator need only adjust the optical means to view the terrain from a desired angle, the reticle being automatically shifted to a proper position corresponding to the viewing angle. This manual drive includes a disc 52 provided adjacent its outer periphery with a handle and fixed to a shaft 46 which is turnably carried by the support means, so that elements 52, 46 form a hand crank for the operator. The shaft 46 has a worm 51 fixed thereto and meshing with a worm wheel 50 which is fixed to the upper right end of shaft 49, as viewed in Fig. 1. The outer side surface of the tubular portions 34 and 37 of the support means is provided with a pair of lugs which carry aligned bearing 56 through which the shaft 49 extends, so that this shaft 49 is located outside of the tubular portions 34 and 37, extends along these tubular portions, and is rotatably supported by the bearing 56. The portion 12 of the support means has an area which is considerably larger than the cross section of tubular portion 34 and which extends laterally therefrom, and the shaft 49 interior through an opening in the frame portion 12 into the entire of the latter, the lower left end of shaft 49, as viewed in Fig. 1, being turnably carried by the frame portion 12. To this lower left end portion of shaft 49 a gear 48 is fixed so that upon turning of the hand crank 52 this gear 48 will rotate together with shaft 49. The gear 48 meshes with a rack 27 fixed to the lower face of carriage 21 and extending from a side edge portion thereof, as indicated in Figs. 1 and 2. Thus, the rotation of shaft 49 results in shifting of the carriage 21 and the reticle therewith. The rack 27 is provided at its side edge distant from gear 48 with additional rack teeth meshing with a gear 28 rotatably carried by the frame portion 12, and this gear 28 meshes with a gear 29 also rotatably carried by the frame portion 12, the gear 29 in turn meshing with a gear 30 fixed to a shaft 31 which is rotatably carried by the frame portion 12 and which extends beyond the latter toward the frame portion 11, as shown in the lower left portion of Fig. 1. The shaft 31 has a worm 32 fixed thereto, and this worm 32 meshes with a worm wheel 33 which is turnably carried by the frame portion 11 and which is fixed to the housing of the prism 13 so that the rotation of shaft 49 results in tilting of the prism 13 as well as in shifting the reticle 16, the prism 13 turning about the axis of the worm wheel 33. This tilting of the prism changes the viewing angle of the apparatus.

The frame portion 12 of the support means is provided with an opening which forms an extension of the tubular portion 34 which is fixed to and extends from the frame portion 12, this tubular portion 34 being provided with ribs 35 and 36 so that a rigid connection is provided. The tubular portion 37 of the support means is provided in its interior with a mirror 38 and a mirror 39, and an erector lens system 45 is mounted in the tubular portion 37 between the mirrors 38 and 39, as shown in Fig. 1. Thus, the light rays passing from the reticle 16 through the stationary reticle 53 and the lens 47 continue to the mirror 38 which reflects the light rays through the lens system 45 to the mirror 39 which in turn directs the light rays along the tubular portion 40 of the support means to the eye lenses 41 and 42 carried by the tubular portion 40. Thus, the lenses, the prisms, and the mirrors of Fig. 1 form an optical means for creating an image in the viewing device formed by the lenses 41 and 42. The parts are designed so that an erect, real image of the reticle field is formed between the lenses 41 and 42 so that an observer 43 with his eyes in position 44 can simultaneously see the image of the reticle and the image formed by the objective 10 in the plane of the reticle 16. It is apparent that the optical elements without the reticle form an optical means for creating in the viewing device 41, 42 an image of a part of the earth's surface viewed from an angle determined by the position of prism 13, while the reticle 16 itself forms an optical means for superimposing upon this image of the earth's surface an image of that portion of the reticle which corresponds to the particular angular position of prism 13.

In Figs. 1 and 2 the parts are shown in that position where the light rays come from the terrain directly below the aircraft, and as is apparent from Fig. 2, in this position of the parts the nadir point 26 of the reticle 16 coincides with the intersection of the crosshairs of the stationary reticle 53.

Figure 3:
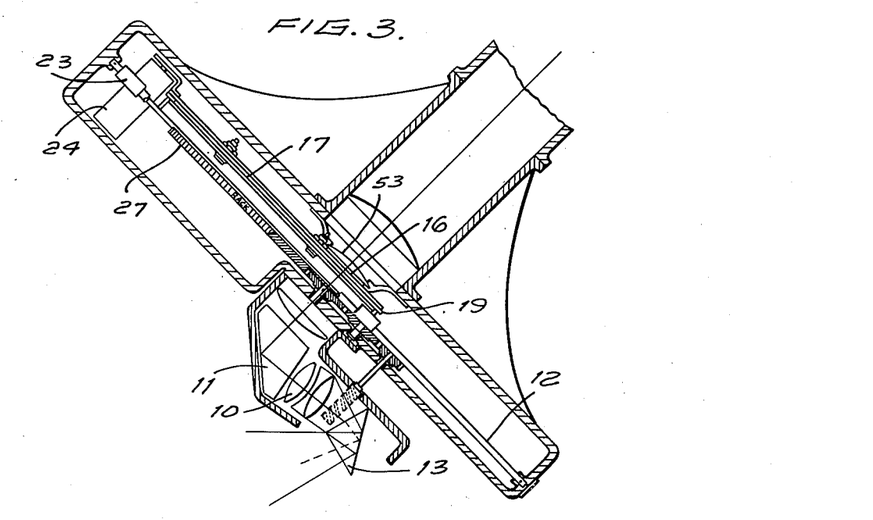
Fig. 3 is a view corresponding to Fig. 1 of the structure shown in the lower left portion of Fig. 1, this structure being shown in Fig. 3 in a position different from that of Fig. 1.
Figure 4:
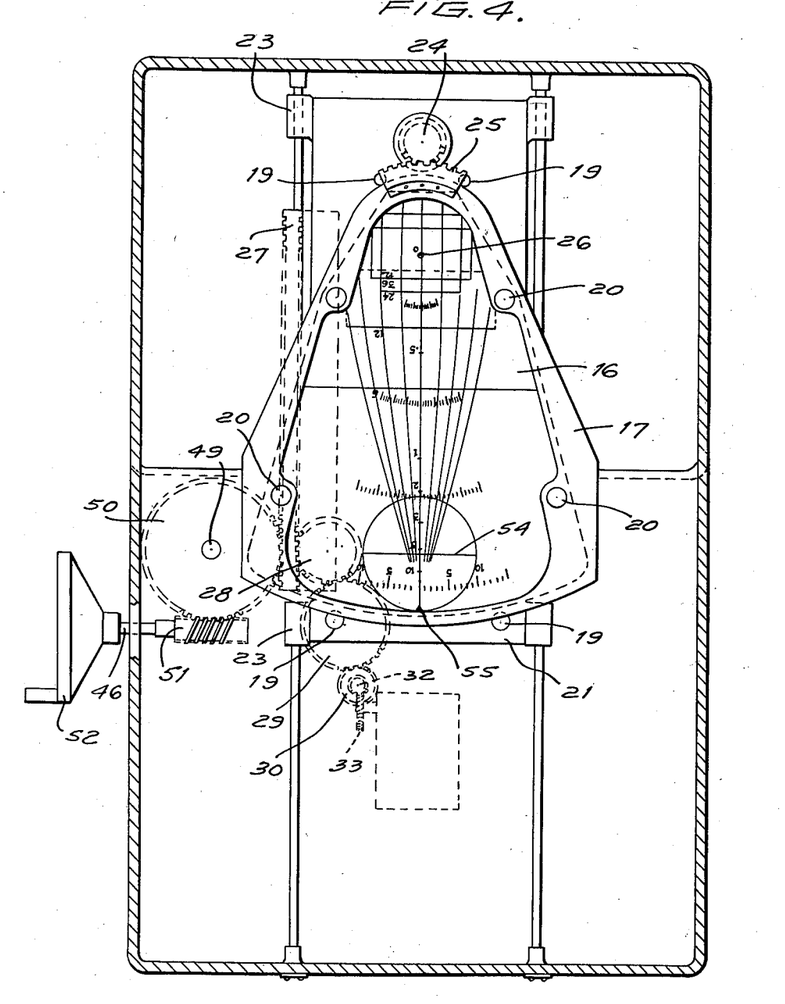
Fig. 4 is a view corresponding to Fig. 2 but showing the parts in the position which corresponds to Fig. 3.

Fig. 3 of the drawings shows the structure at the lower left portion of Fig. 1 in the position where the prism 13 has been turned to its forwardmost viewing angle, and in this position of the parts the reticle 16 has been shifted to an end position opposite from that of Fig. 1, the lower end portion of the reticle 16 being located beneath the stationary reticle 53 in the position of the parts shown in Fig. 3. Fig. 4 of the drawings is a view corresponding to Fig. 2 of the parts when in the position shown in Fig. 3, and it is apparent from Fig. 2 that the carriage 21 has shifted to the opposite end of the frame 12 while the stationary reticle 53 is located over the end of reticle 16 opposite from that over which the reticle 53 is located in Fig. 2. Fig. 4 clearly shows how the nadir point 26 is shifted when the parts are in the position of Fig. 4, and it is apparent that with the parts in this position, and even well before the parts reach this position, the nadir point 26 will be out of the field of vision provided by the viewing device 41, 42.

Figure 5:
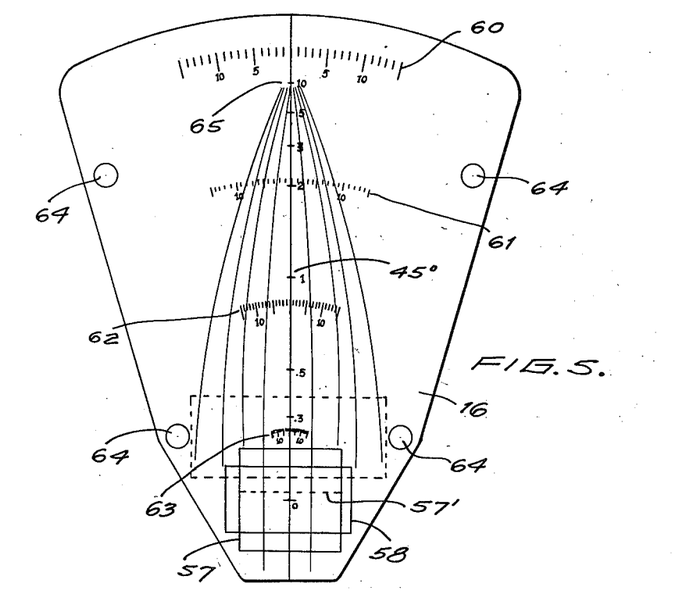
Fig. 5 illustrates that face of the reticle of the invention which has engraved thereon the reticle indicia of the present invention.

As has been indicated above, the reticle 16 is provided with a particular set of indicia in accordance with the present invention, and this indicia is clearly illustrated in Fig. 5 which shows the reticle itself and in particular that face of the reticle which is engraved with the indicia. Fig. 5 shows the openings 64 of the reticle 16 through which the lamps 20 extend. Four scales 60, 61, 62 and 63 are provided so as to be visible at four different viewing angles and these scales indicate the wind drift. Furthermore, nine tracking lines 65 are provided, eight of these lines being symmetrically distributed on opposite sides of the central tracking line 65 which extends along the entire reticle 16 and with which all of the indicia such as the scales are symmetrical. The tracking lines 65 are continuously usable while the reticle is moving. The central tracking line 65 is crossed by a plurality of distance indicating lines which are distributed along this central tracking line, these distance indicating lines being respectively located adjacent the numbers 0, .3, .5, 1, 2, 3, and 5 shown in Fig. 5. These latter numbers are related to the altitude of the aircraft and are used as distance measuring markings. When an object viewed through the apparatus of the invention is located along a horizontal extension of any one of these distance indicating lines, it is only necessary to multiply the altitude of the aircraft by the particular number of a given distance indicating line in order to determine the ground distance of the object from the aircraft. For example, the distance indicating line located adjacent the number 1 corresponds to the viewing angle of 45°, and an object viewed at this line would be located at a ground distance from the aircraft equal to the altitude thereof. In the same way any object appearing on a horizontal extension of the distance line located adjacent the number 2 is two altitudes distance from the aircraft.

As is apparent from Fig. 5 the movable reticle 16 is provided with lines 57 and 58 respectively defining rectangular areas corresponding to the frames of pictures taken with 24" and 36" lenses, respectively, of a camera. Also, the movable reticle 16 may be provided with a dash line 57', for example, indicating overlap of a desired degree between two successive pictures. The frames indicated by the lines 57 or 58 cooperate with the track lines 65. For example, it will be seen that with the parts in the position of Fig. 2 the outermost track lines do not extend to the areas included by frames 57 or 58. Therefore, the observer knows that an object on one of these outermost track lines will not be located in a picture taken by a camera used in the apparatus. If the observer wishes a picture of such an object to be taken, then he notices on one of the scales 60—65 how many degrees away from the center track line this object is, and the pilot is notified to change the course accordingly. If an object is seen to move laterally with respect to the track lines, the observer rotates the reticle until the object will not move laterally any more. The amount of wind drift of the plane is then measured by the intersection of the vertical line of the fixed reticle with any of the then visible angular scales. This amount in degrees is made known to the camera operator so that he may rotate his camera accordingly.

Figure 6:
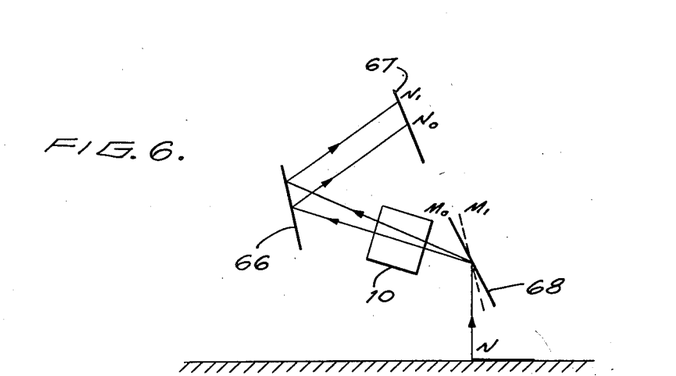
Fig. 6 is a diagrammatic illustration of the manner in which the nadir point shifts when the viewing angle is changed.

Fig. 6 of the drawings indicates diagrammatically how the position of the nadir point changes in the reticle plane 67. Referring to Fig. 6 it will be seen that a light ray coming from a point N on the ground directly beneath the aircraft is reflected by a tiltable member 68 through the objective 10, member 68 being a light guiding member corresponding to the prism 13. This point N is the nadir point. The light rays coming from the ground at the nadir point always are reflected from the same point of the reflector 68 even if the latter is tilted from the position $M_0$ to the position $M_1$. These light rays after passing through the objective 10 are reflected by the mirror 66 or the like to the reticle 67. When reflector 68 is in the $M_0$ position the nadir point will be located at $N_0$ on the reticle 67, while when the reflector 68 is in the position $M_1$, the nadir point will be located at the point $N_1$ on the reticle 67. Thus, it will be seen that tilting of a light guiding member such as the prism 13 will result in a shifting of the nadir point of the reticle, and the gear train connecting the crank 52 to the prism 13 and to the reticle 16 is designed so that the reticle will be shifted through a distance equal to that through which the nadir point is moved in the plane of the reticle by tilting of the prism 13.

Figures 7, 9:
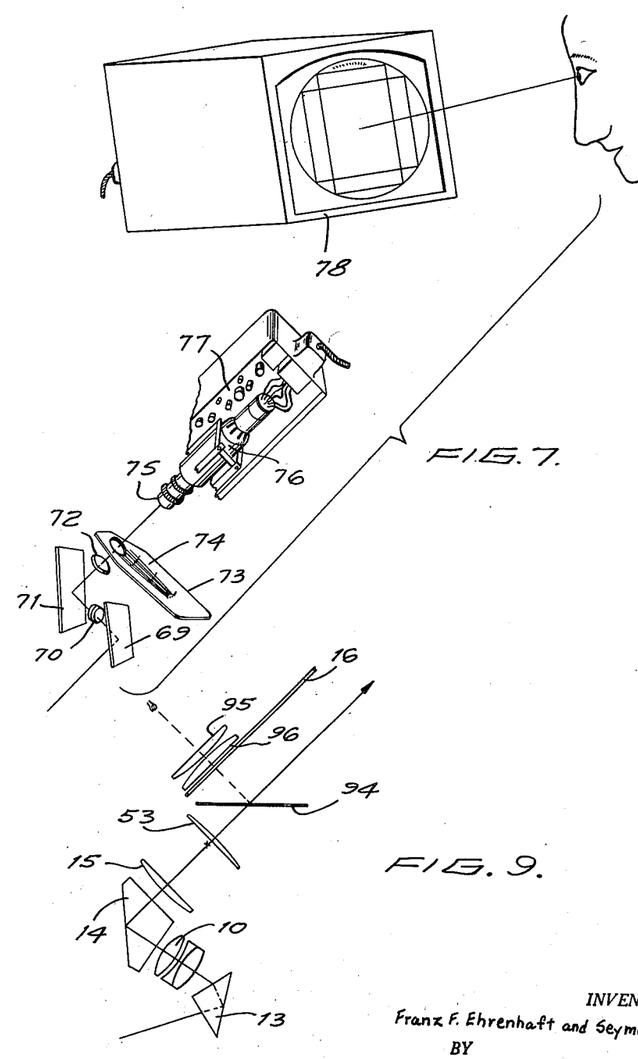
Fig. 7 diagrammatically illustrates the use of the viewing apparatus of the invention with a closed television circuit.
Fig. 9 is a diagrammatic illustration of another possible embodiment of the apparatus of the invention.

Fig. 7 diagrammatically illustrates the device of the invention associated with a closed television circuit. Thus, the reflector 69, corresponding to prism 13, directs the light rays through the objective 70 to the reflector 71 which reflects the light rays through the lens 72 onto the reticle 73. The indicia 74 on the reticle is picked up by the television camera lens 75, and the images of the reticle and the part of the earth's surface viewed by the apparatus is scanned with the television pick-up tube 76. Through the amplifier 77 the scanned image is transmitted by a closed circuit to the television receiver 78. It will be noted that this arrangement provides a real image of the field in the plane of the reticle and a second focal plane is formed inside the television pick-up tube to enable the reticle to be moved outside of the camera. Thus, the reticle pattern is not located on the photosensitive surface inside the pick-up tube, in accordance with the present invention. By thus arranging the field and the reticle outside of the television camera a very important advantage is obtained. It is known that no television system can be devised which does not distort the scanned image to some extent. Such distortion is negligible when the reticle is arranged in the same plane as the image, since the reticle is distorted to the same degree as the image and there is no relative displacement between the reticle pattern and the objects in the field of vision. Thus, the arrangement of the present invention completely eliminates inaccuracies resulting from different distortions of the reticle pattern and the image of the objects on the ground.

Figure 8:
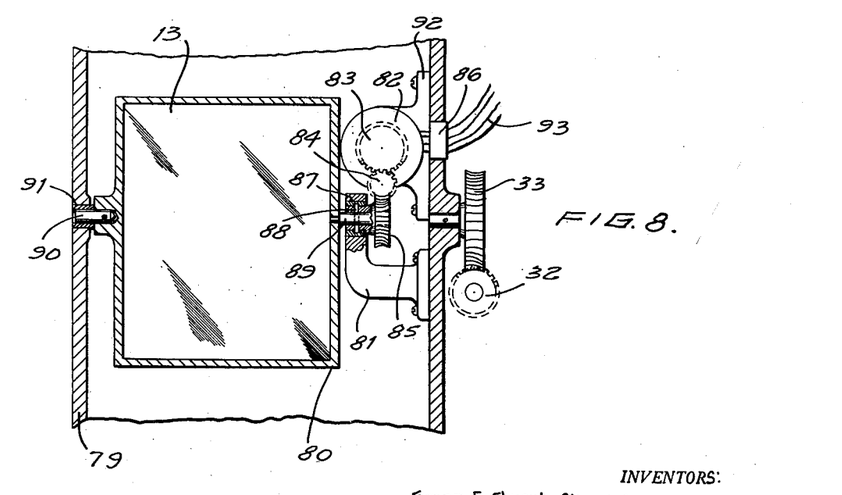
Fig. 8 is a partly sectional fragmentary elevational view of a structure for automatically compensating for pitch changes of an aircraft.

Fig. 6 of the drawings also demonstrates the result of pitching of the aircraft. Thus, it is evident from Fig. 6 that if the aircraft pitches so that the reflector 68 moves between the two positions shown in Fig. 6, the nadir point on the reticle will also change. Fig. 8 shows an arrangement for automatically tilting the prism 13 in order to compensate for pitch changes of the aircraft. As is apparent from Fig. 8, the prism 13 is located within a housing 80. Shafts 89 and 90 are fixed to and extend from the side walls of the housing 80, respectively. A housing 79 is provided with a bearing 91 in which the shaft 90 is turnably mounted. The shaft 89 extends into a tubular member 87 which is fixed to the shaft 89 by a cross pin 88, the tubular member 87 being turnable within a bearing coaxial with bearing 91 and carried by a bracket 81 fixed in the interior of the housing 79. The tubular member 87 is fixed to and extends laterally from a worm wheel 85 meshing with a worm 83 which is coaxial with and fixed to a gear meshing with the gear 84 which is connected to the motor 82 to be driven thereby, this motor 82 being carried by a bracket 92 also fixed to the interior of the housing 79. The worm 33 is fixed to the exterior of housing 79 and is coaxial with shafts 89 and 90, this worm gear 33 meshing with the worm 32 which is rotated by the reticle drive in the manner described above in connection with Figs. 1 and 2. A connector 86 is electrically connected to the motor 82, which is a synchromotor, and flexible leads 93 lead from the connector 86 to a gyroscope or the like which registers changes in pitch of the aircraft and sends the proper signals through the leads 93 to the motor 82 for operating the latter to tilt the prism 13 to compensate for such changes in pitch.

It will be noted that with the above described embodiments of the invention the reticle is located in the focal plane of the objective 10. Such an arrangement, however, is not essential, and Fig. 9 illustrates diagrammatically an arrangement where the reticle 16 is located outside of the focal plane of the objective. By means of a light source and condensing lenses 95 and 96 the image of the reticle 16 is projected into the optical means of Fig. 1 which creates in the viewing device an image of part of the earth's surface. The elements 13, 10, 14, 15 and 53 of Fig. 9 are identical with those elements of Fig. 1 designated with the same reference characters. Element 94 of Fig. 9 is a semitransparent reflector which allows the light rays from the objective 10 to pass through element 94 and at the same time reflects the image of the reticle 16 to the erector lens. Of course, with the arrangement of Fig. 9 a suitable drive will be provided for shifting the reticle 16 simultaneously with tilting of the prism 13.

It will be understood that each of the elements described above, or two or more together, may also find a useful application in other types of viewing apparatus differing from the types described above.

While the invention has been illustrated and described as embodied in apparatus for shifting a reticle simultaneously with a change in the viewing angle of a viewing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An aerial viewing apparatus for viewing the surface of the earth at different angles located in a vertical plane, comprising, in combination, support means; a viewing device mounted on said support means; optical means carried by said support means and having at least a part thereof adjustable for creating in said viewing device visible images of parts of the earth's surface as viewed from different angles, respectively; first adjusting means operatively connected to said optical means for moving at least said part of said optical means to a position creating in said viewing device an image corresponding to one of said angles; a reticle composed of reticle portions respectively corresponding to different viewing angles of said optical means, said reticle being carried by said support means for movement across the optical axis of said optical means to create in said viewing device, superimposed on the visable image of a part of the earth's surface, a visible image of one of said reticle portions; and second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means.

2. An aerial viewing apparatus for viewing the surface of the earth at different angles located in a vertical plane, comprising, in combination, support means; a viewing device mounted on said support means; optical means carried by said support means and having at least a part thereof adjustable for creating in said viewing device visible images of parts of the earth's surface as viewed from different angles, respectively; first adjusting means operatively connected to said optical means for moving at least said part of said optical means to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions; and second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means.

3. An aerial viewing apparatus for viewing the surface of the earth at different angles located in a vertical plane, comprising, in combination, support means; a viewing device mounted on said support means; optical means carried by said support means and having a light guiding member tiltably carried by said support means for creating in said viewing device visible images of parts of the earth's surface as viewed from different angles, respectively; first adjusting means operatively connected to said optical means for moving at least said light guiding member of said optical means to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions; and second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means.

4. An aerial viewing apparatus for viewing the surface of the earth at different angles located in a vertical plane, comprising, in combination, support means; a viewing device mounted on said support means; optical means carried by said support means and having a light guiding member tiltably carried by said support means for creating in said viewing device visible images of parts of the earth's surface as viewed from different angles, respectively; first adjusting means operatively connected to said optical means for moving at least said light guiding member of said optical means to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions; second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means; and compensating means operatively connected to said light guiding member for automatically tilting the latter to compensate for changes in the pitch of an aircraft carrying the viewing apparatus.

5. An aerial viewing apparatus for viewing the surface of the earth at different angles located in a vertical plane, comprising, in combination, support means; a viewing device mounted on said support means; optical means carried by said support means and having at least a part thereof adjustable for creating in said viewing device visible images of parts of the earth's surface as viewed from different angles, respectively; first adjusting means operatively connected to said optical means for moving at least said part of said optical means to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions, said support means also supporting said reticle for turning movement in said plane about an axis passing through that point of said reticle to which the nadir point is projected when said optical means is adjusted to view a part of the earth's surface located directly beneath the viewing apparatus; second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means; and drift compensating means operatively connected to said reticle for turning the latter in said plane about said axis passing therethrough through an angular distance which compensates for drift of an aircraft carrying the viewing apparatus.

6. An aerial viewing apparatus for viewing the surface of the earth at different angles located in a vertical plane comprising, in combination, support means; a viewing device mounted on said support means; optical means carried by said support means and having a light guiding member tiltably carried by said support means for creating in said viewing device visable images of parts of the earth's surface as viewed from different angles, respectively; first adjusting means operatively connected to said optical means for moving at least said light guiding member of said optical means to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions, said support means also supporting said reticle for turning movement in said plane about an axis passing through that point of said reticle to which the nadir point is projected when said optical means is adjusted to view a part of the earth's surface located directly beneath the viewing apparatus; second adjusting means interconnected with said first adjusting means to be operated automatically together with the same and operatively connected to said reticle for automatically moving the latter across said optical axis to locate in the field of vision of said viewing device an image of that reticle portion which corresponds to the particular viewing angle to which said optical means is adjusted by said first adjusting means; drift compensating means operatively connected to said reticle for turning the latter in said plane about said axis passing therethrough through an angular distance which compensates for drift of an aircraft carrying the viewing apparatus; and compensating means operatively connected to said light guiding member for automatically tilting the latter to compensate for changes in the pitch of an aircraft carrying the viewing apparatus.

7. An aerial viewing apparatus for viewing the surface of the earth at different angles located in a vertical plane, comprising, in combination, support means; a viewing device mounted on said support means; optical means carried by said support means and having a light guiding member tiltably carried by said support means for creating in said viewing device visible images of parts of the earth's surface as viewed from different angles, respectively; a crank turnably carried by said support means; first transmission means operatively connected to said crank and extending therefrom to said light guiding member for tilting the same upon turning of said crank for moving said light guiding member to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions; and second transmission means interconnected with said first transmission means to be operated automatically together with the same and operatively connected to said reticle for automatically moving the latter in said plane across said optical axis to locate in the field of vision of said viewing device an image of that reticle portion which corresponds to the particular viewing angle to which said light guiding member is adjusted by said first transmission means, whereby operation of said crank to change the angle of said light guiding member automatically shifts said reticle in said plane to a proper position with respect to said light guiding member.

8. An aerial viewing apparatus for viewing the surface of the earth at different angles located in a vertical plane, comprising, in combination, support means; a viewing device mounted on said support means; optical means carried by said support means and having a light guiding member tiltably carried by said support means for creating in said viewing device visible images of parts of the earth's surface as viewed from different angles, respectively; a crank turnably carried by said support means; a gear train operatively connected to said crank and extending therefrom to said light guiding member for tilting the same upon turning of said crank for moving said light guiding member to a position creating in said viewing device an image corresponding to one of said angles; a reticle composed of reticle portions respectively corresponding to different viewing angles of said optical means, said reticle being located in a plane normal to the optical axis of said optical means and being carried by said support means for shifting movement in said plane across said optical axis to create in said viewing device, superimposed on the visible image of a part of the earth's surface, a visible image of one of said reticle portions; and a rack fixed to said reticle and forming part of said gear train to be operated automatically together with the same for shifting said reticle in said plane across said optical axis to locate in the field of vision of said viewing device an image of that reticle portion which corresponds to the particular viewing angle to which said light guiding member is adjusted by said gear train, whereby operation of said crank to change the angle of said light guiding member automatically shifts said reticle in said plane to a proper position with respect to said light guiding member.

References Cited in the file of this patent
UNITED STATES PATENTS

| | | |
|---|---|---|
| 1,217,169 | Grauheding | Feb. 27, 1917 |
| 1,783,769 | Bates | Dec. 2, 1930 |
| 1,893,542 | Faberholm | Jan. 1, 1933 |
| 2,154,454 | Joyce | Apr. 18, 1939 |
| 2,162,723 | Karnes | June 20, 1939 |
| 2,281,772 | Klemperer | May 5, 1942 |
| 2,335,286 | Klemperer et al. | Nov. 30, 1943 |
| 2,359,032 | Gott | Sept. 26, 1944 |
| 2,392,436 | Van Auken | Jan. 8, 1946 |
| 2,464,195 | Burley et al. | Mar. 8, 1949 |
| 2,465,957 | Dienstbach | Mar. 29, 1949 |
| 2,484,537 | Van Dyke | Oct. 11, 1949 |
| 2,719,470 | Jensen | Oct. 4, 1955 |